United States Patent Office

3,324,107
Patented June 6, 1967

3,324,107
DIALKYLAMIDE PURIFICATION
Walter Ronald Andrews, Jr., Waynesboro, Va., and Walter John Sloan, Wilmington, Del., assignors to E. I. du Pont de Nemours and Company, Wilmington, Del., a corporation of Delaware
No Drawing. Filed Mar. 27, 1964, Ser. No. 355,493
5 Claims. (Cl. 260—561)

This invention relates to the purification of dialkylamides. More particularly, it relates to the processing of impure dialkylamides for use as solvents in spinning operations.

In the spinning of spandex fibers and acrylonitrile fibers, it is common practice to use the lower dialkylamides of lower fatty acids, such as N,N-dimethylformamide and N,N-dimethylacetamide, as polymer solvents. These materials are good solvents for such polymers, and solutions thereof may be extruded or "dry spun" into filaments of high quality. Because of economic considerations, it is desirable to recover the evaporated solvent and reuse it. In practice, most of the solvent is recovered from the spinning cells by condensation from the aspiration gases, but since it has been subjected to relatively high temperatures during the spinning operation, it is contaminated with impurities.

Typical practice in which an aspiration condensate is obtained from a dry spinning cell, for treatment in accordance with the present discovery, is disclosed in U.S. Patent 3,094,374 relating to a dry spinning process for preparing spandex filaments, to which reference can be made. The present invention is applicable to the treatment of such condensate for reuse without regard to the details of the spinning operation nor to the specified spandex composition being produced.

Known purification processes for the dialkylamides involve distillation or deionization or both. It has been observed on occasions that such processes do not completely remove all impurities from the recovered solvent. In particular, the solvent retains either colored impurities or impurities which, though colorless, generate color on exposure to ultraviolet light. As used herein, the term "UV color" refers to the color in the solvent after exposure to sunlight or intense ultraviolet light.

An object of this invention is provision of dialkylamide solvents substantially free of color and color-forming bodies and useful in the formation of polymer solutions and resulting yarns of improved color and quality. Another object of the invention is the purification of recovered dimethylacetamide solvent for use in spinning spandex fibers.

These and other objects are accomplished by a process of purifying a lower dialkylamide of a lower fatty acid which comprises bringing the substantially anhydrous dialkylamide at a pH of less than 7 into contact with an insoluble bisulfite-polyamide anion exchange resin, and separating the dialkylamide from said resin. As used herein the term insoluble indicates no appreciable solubility in the dialkylamide being treated.

The solvents which may be purified by the process of this invention are the lower dialkylamides of the lower fatty acids. These include dimethylformamide, diethylformamide, dimethylacetamide, dimethylpropionamide, and diethylacetamide.

A number of synthetic resin, anion-exchange materials commercially available are suitable for use in preparing the bisulfite ion-exchange resins. Such materials include, for example, the product of reaction of a methylol-forming phenol, an alkylene polyamine, and formaldehyde, as taught in U.S. Patent 2,402,384. Also, the commercially available quaternary ammonium ion-exchange resins prepared as described in U.S. Patent 2,591,573 as well as other similar resins are suitable. Such materials include those sold by Rohm & Haas Company under the trademarks "Amberlite IRA–400" and "Amberlite XE–208." The insoluble, ion-exchange resin of the aforementioned types must be converted to the insoluble, bisulfite resin employed in the practice of this invention by treatment with a dilute solution of sodium bisulfite or other soluble bisulfite material.

The dialkylamide which is to be treated according to the process of this invention should first be freed of all gross impurities which might tend to clog the resin bed and should be substantially anhydrous. The term "substantially anhydrous" signifies a water content of less than 5% by weight. The aspiration condensate from a cell in which a spandex fiber is dry-spun from a solution in dimethylacetamide ordinarily contains about 2% of water.

In the practice of this invention, it is necessary to adjust the pH of the dialkylamide to a value below 7 before it is brought into contact with the bisulfite resin. For obtaining maximum benefit from this invention, the pH should preferably be within the range from about 5 to about 6.5. If the pH of the dialkylamide is too high, it is brought into the proper range by distillation, acidification, deionization, or by a combination of such procedures. Frequently, distillation alone accomplishes the desired adjustment of pH by stripping off not only water but also low-boiling, basic impurities comprising mainly the dialkylamines, such as dimethylamine, diethylamine, etc. Conventional deionization procedures may also be applied to the dialkylamide, if desired, such as by passage through a bed of cationic resin such as "Amberlite IR–200" (Rohm & Haas Company) prior to passage through the bisulfite resin described above. A mixed bed of cationic resin and bisulfite resin, for example "Amberlite IR–200" and the bisulfite form of "Amberlite IRA–400," is suitable for use in the present invention but is slightly less efficient than separate beds used sequentially. However, in sequential operation, passing the dialkylamide through the bisulfite resin before passage through the cationic resin is not satisfactory when the pH of the dialkylamide is outside the prescribed limits during passage through the bisulfite resin.

The time of treatment and the temperature at which the dialkylamide is treated can be varied over a broad range. The time required to substantially remove the color-producing impurities will depend on the size of the resin bed, the particular resin and its relative freshness. The temperature must of course be below the boiling point of the dialkylamide being treated. Suitable conditions can be readily selected by those skilled in the art. In practice to date, ambient temperature has been used, and the dialkylamide was passed through the resin at conventional flow rates with satisfactory results.

A column containing exhausted bisulfite ion exchange resin may be regenerated by first passing through the column a dilute solution (approximately 5%) of caustic soda followed by a dilute solution (about 5%) of sodium bisulfite. The column is then washed with water to remove free sulfurous acid and is ready for reuse.

This invention is further illustrated, but is not intended to be limited, by the following examples in which parts and percentages are by weight unless otherwise specified. The color of the products is determined by electrophotometric measurement (using light of 425 millimicrons wave length) and is reported herein as Hazen color numbers, which are the same as the widely used scale of the American Public Health Association. On this scale, distilled water is zero, and standard samples of stable inorganic salt solutions provide recognized calibration points. "UV color" is reported in Hazen numbers after exposure of a 50-ml. sample to a long-wave ultraviolet light source with maximum emission at 366 millimicrons wave length for four hours. The light source is a fluorescent light of two tubes with a power rating of 15 watts per tube. The sample is contained in a glass-stoppered bottle of soft glass.

*Example I*

A quaternary ammonium ion exchange resin commercially available in the chloride form as "Amberlite IRA-400" (Rohm and Haas Company), is placed in a glass column measuring 3.8 millimeters in diameter and 86 millimeters in length and is rinsed with distilled water. It is then treated with a 5% aqueous sodium sulfate solution, again rinsed with distilled water, treated with a 5% aqueous sodium hydroxide solution, rinsed with distilled water, treated with a 10% aqueous sodium bisulfite solution, and finally again rinsed with distilled water.

Two samples of aspiration condensate from a cell in which a spandex fiber has been dry-spun from a solution in dimethylacetamide are submitted separately to the following procedure: The sample is first stripped of low-boiling impurities in a distillation column and is then distilled in a second distillation column from which it is removed as the distillate. The sample is next passed through a column having the dimensions given above but containing a cationic resin, "Amberlite IR-200" (Rohm and Haas Company). The first 300 ml. of the effluent are discarded, and the remainder of the sample is analyzed for pH, color, and "UV color" and is then passed through the bisulfite resin column described in the preceding paragraph. The first 300 ml. of effluent from this column are also discarded, and the remaining effluent is collected and analyzed. Passage through each column is at a flow rate of 20–50 ml. per minute and is carried out at room temperature. The following results are obtained:

| Sample No. | Effluent From IR-200 Resin | | | Effluent From Bisulfite Resin | | UV Color Removal, Percent |
|---|---|---|---|---|---|---|
| | Color | UV Color | pH | Color | UV Color | |
| 1 | 7 | 34 | 6.8 | 7 | 5 | 85 |
| 2 | 0 | 47 | 6.2 | 2 | 14 | 70 |

*Example II*

Five samples of dimethylacetamide aspiration condensate recovered from a spandex dry-spinning process are submitted separately to the following procedure: The sample is treated with sufficiently diethylamine to give a pH of 10 and is then mixed with sufficient 35% hydrogen peroxide solution to give a mixture containing about 0.25% peroxide. The mixture is heated at 155–160° C. for about 15 minutes and is fed to a distillation column from which water and other low-boiling impurities are distilled off. The dehydrated product is taken off at the base of the column as a vapor, condensed, and fed to a second distillation column from which it is distilled. The distillate is passed through a column containing the "Amberlite IR-200" resin, as described in Example I. The product from this column is analyzed and is passed through a column containing bisulfite resin, as described in Example I. The final effluent is analyzed. Results are shown below:

| Sample No. | Effluent From IR-200 Resin | | | Effluent From Bisulfite Resin | | UV Color Removal, Percent |
|---|---|---|---|---|---|---|
| | Color | UV Color | pH | Color | UV Color | |
| 3 | 0 | 13 | 6.4 | 0 | 0 | 100 |
| 4 | 0 | 8 | 6.6 | 0 | 0 | 100 |
| 5 | 3 | 35 | 6.2 | 0 | 10 | 70 |
| 6 | 4 | 15 | 6 | 0 | 3 | 80 |
| 7 | 0 | 8 | 7 | 0 | 2 | 75 |

As illustrated in the preceding example, the process of this invention may be coupled advantageously with a pretreatment of the recovered dialkylamide with hydrogen peroxide. This pretreatment involves adjusting the pH of the condensed dialkylamide to the range of 9–11 with diethylamine and then mixing with sufficient aqueous hydrogen peroxide to give a mixture containing 0.1–0.5% peroxide. This mixture is fed continuously to a heater at 155–160° C. In the heater, some of the color-forming impurities are oxidized, and the organic peroxides which are formed are partially decomposed. The effluent from the heater is fed to a first column from which the low-boiling impurities are distilled off. The product is taken off at the base of the column and fed to a second distillation column from which it is distilled as a vapor, condensed, and passed through a column containing a suitable cationic resin to provide continuous deionization and adjustment of the acidity before passage through a column containing the bisulfite resin.

It has been found that recovered dimethylacetamide having UV color of less than 20 (Hazen number) is satisfactory for reuse in the preparation of spandex spinning solutions free of objectionable color. This invention affords a process for reducing the UV color of a recovered dialkylamide to an amount of less than 20. The process of this invention is effective in removing from about 70% to 100% of the UV color in recovered dimethylacetamide.

It is not known with certainty what the color-forming impurities in recovered dialkylamide are, but the success of the present invention in overcoming the problem presented by these impurities suggests that an aldehyde is present in the recovered dialkylamide as the precursor of the color-forming impurities, which may be an aldehyde-amine reaction product of the Schiff-base type. During spinning temperatures on the order of 200° to 365° C. are encountered, and it is known that color-forming impurities are formed at those temperatures.

While the invention has been described with reference to specified materials and procedural details, it should be appreciated that changes can be made therefrom without departing from its scope.

What is claimed is:

1. In a process for removing color producing impurities from a substantially anhydrous lower dialkylamide of a lower fatty acid selected from the group consisting of dimethylformamide, diethylformamide, dimethylacetamide, dimethylpropionamide and diethylacetamide, the steps comprising adjusting the pH of said dialkylamide to a value below 7, passing said dialkylamide into contact with an insoluble bisulfite-polyamine anion-exchange resin, and separting said dialkylamide from said resin.

2. The process of claim 1 wherein the pH of said dialkylamide is adjusted to a value between about 5 and about 6.5.

3. A process comprising heating a color containing, aspiration condensate of a lower dialkylamide obtained from a spandex spinning cell, in a distillation zone to remove therefrom low boiling impurities and water, recovering from the distillation zone anhydrous color containing lower dialkylamide having a pH below 7, passing the recovered dialkylamide into contact with an insoluble bisulfite-polyamine anion-exchange resin and separating dialkylamide of reduced color content from the resin.

4. A process in accordance with claim 3 in which the dialkylamide is selected from the group consisting of dimethylformamide, diethylformamide, dimethylacetamide, dimethylpropionamide, and diethylacetamide.

5. A method comprising distilling an aspiration condensate comprising a lower dialkylamide containing color producing impurities recovered from a cell for dry spinning spandex fiber to remove low boiling impurities and water therefrom, passing the resulting lower dialkylamide through a cation exchange resin, recovering from the cation exchange resin lower dialkylamide having a pH below 7 and a water content below about 5%, and passing the recovered dialkylamide into contact with an insoluble bisulfite anion exchange resin to remove color producing impurities therefrom.

References Cited
UNITED STATES PATENTS

| | | | |
|---|---|---|---|
| 2,942,027 | 6/1960 | Hewett et al. | 260—561 |
| 3,072,725 | 1/1963 | Surman | 260—561 |

ALEX MAZEL, *Primary Examiner.*

JOSEPH NARCAVAGE, *Assistant Examiner.*